Sept. 13, 1927.
F. O'NEILL
1,642,660
GLASS PRESSING AND BLOWING MACHINE
Filed Feb. 19, 1924  6 Sheets-Sheet 2
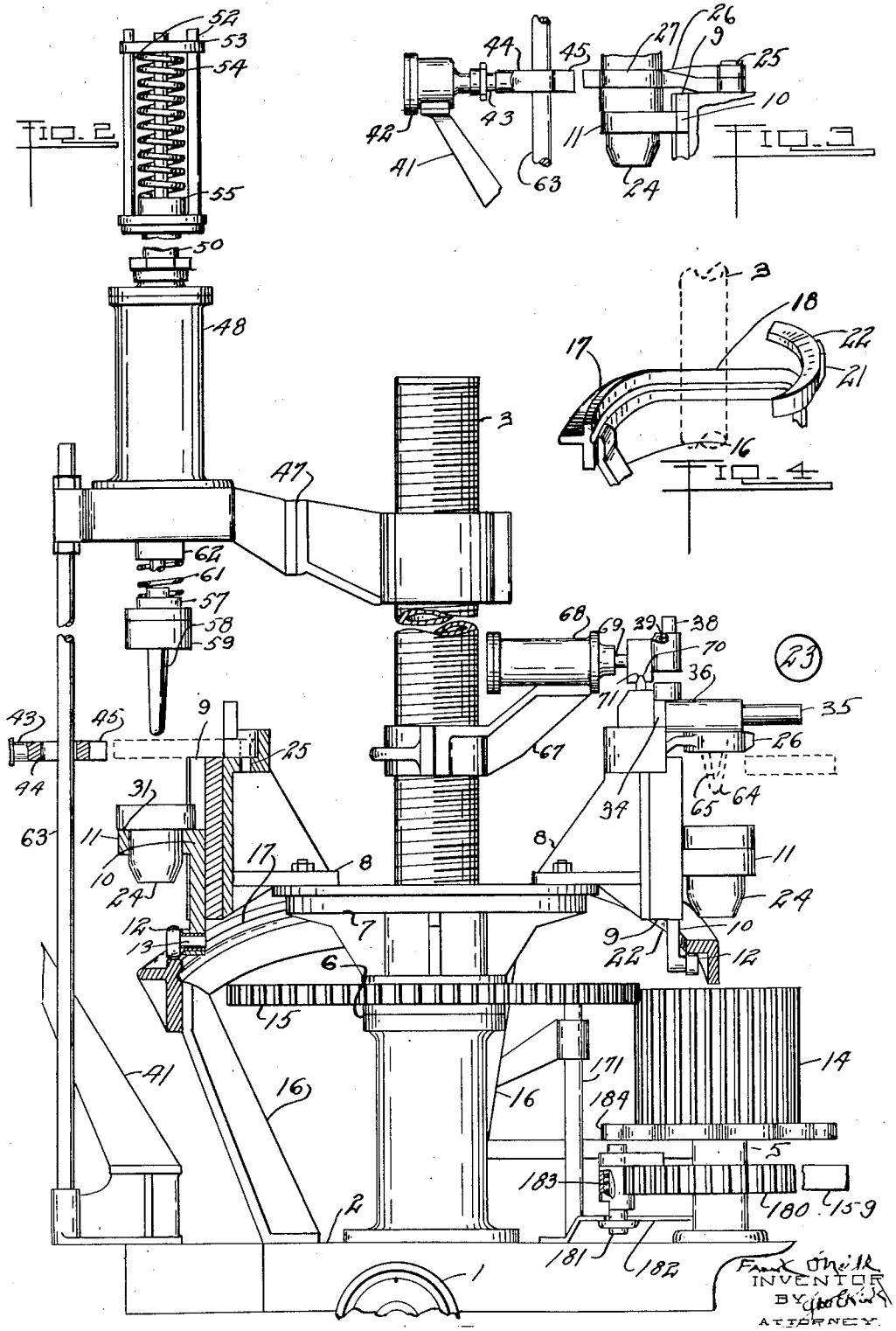

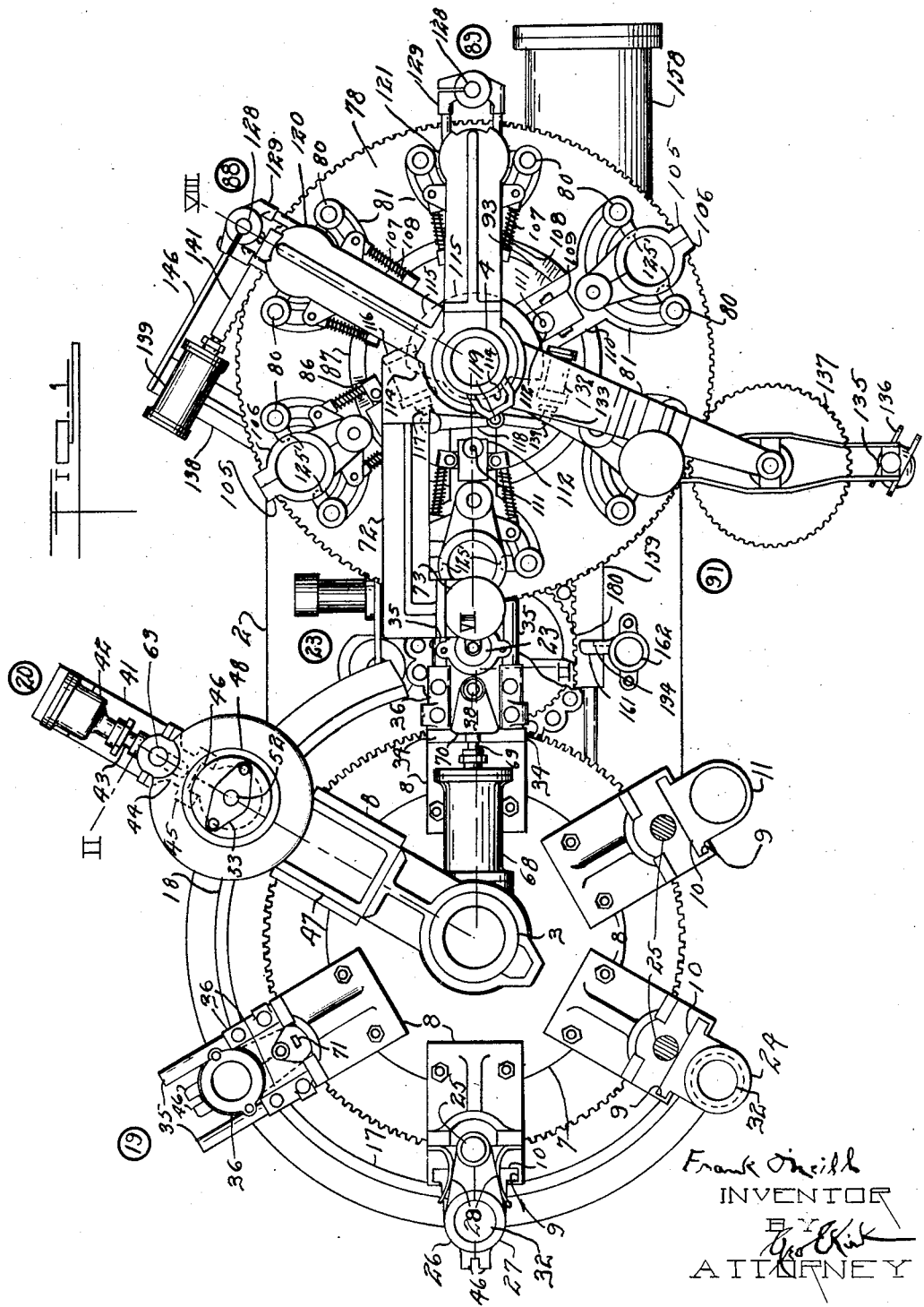

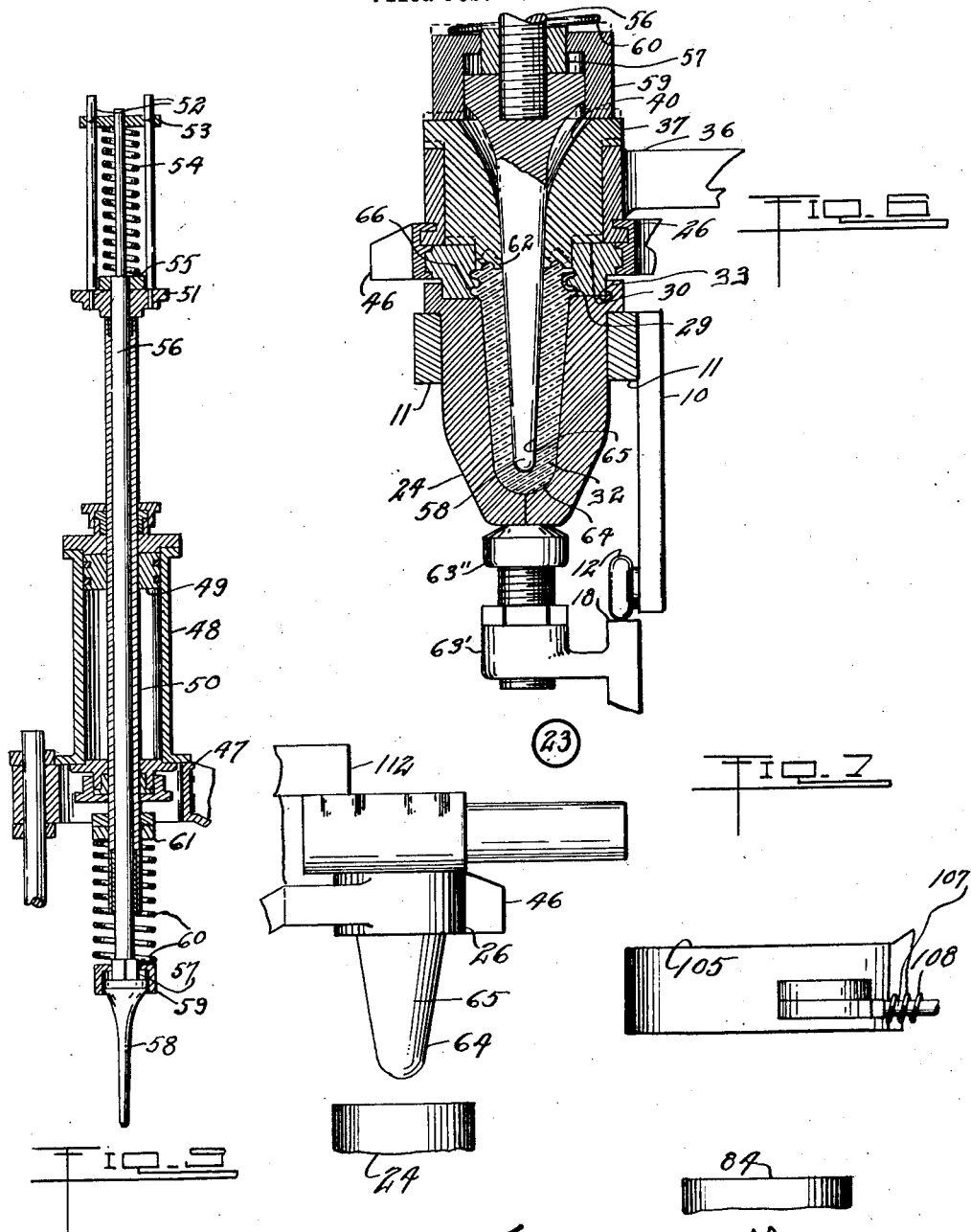

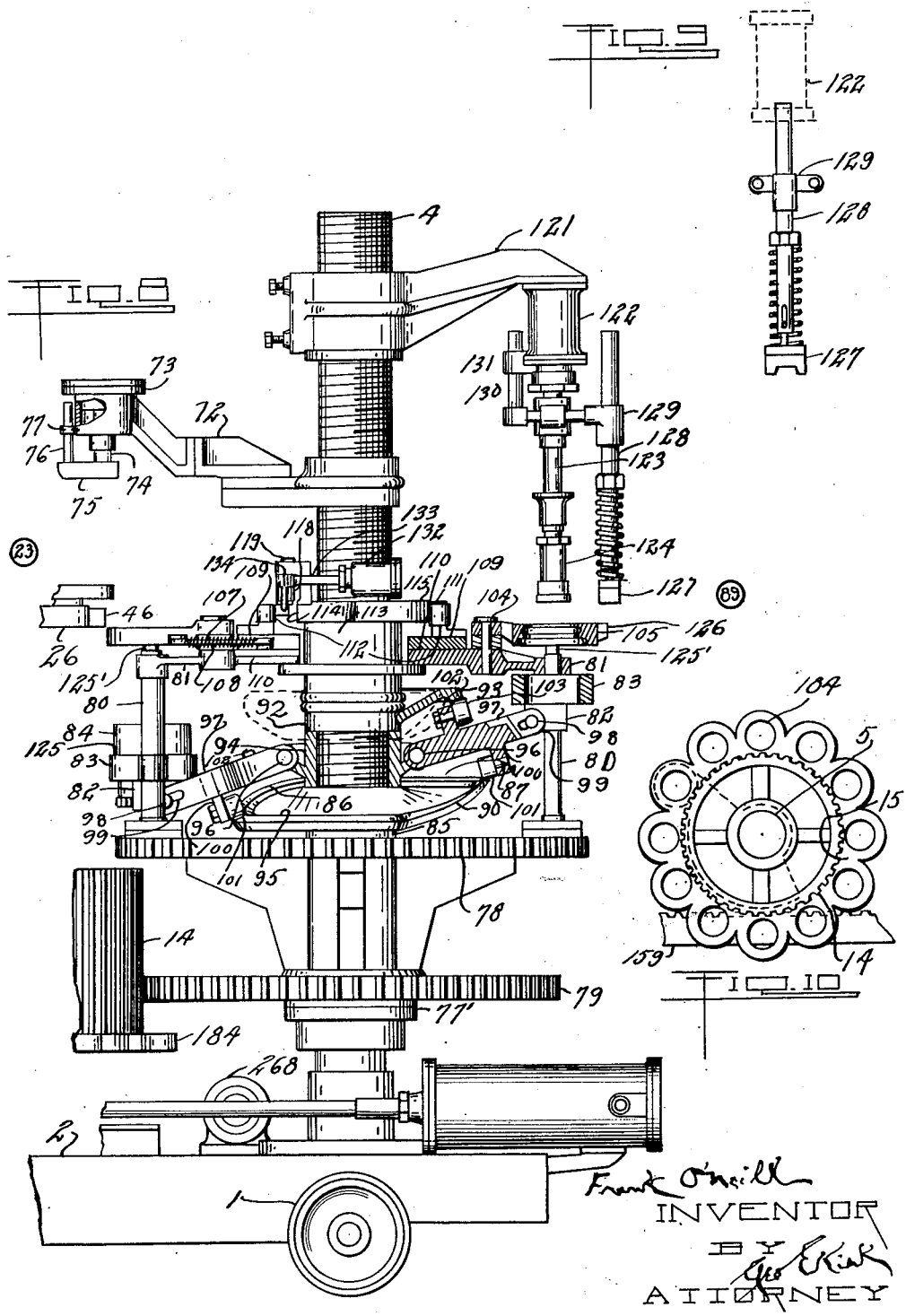

Sept. 13, 1927.  1,642,660
F. O'NEILL
GLASS PRESSING AND BLOWING MACHINE
Filed Feb. 19, 1924  6 Sheets-Sheet 5
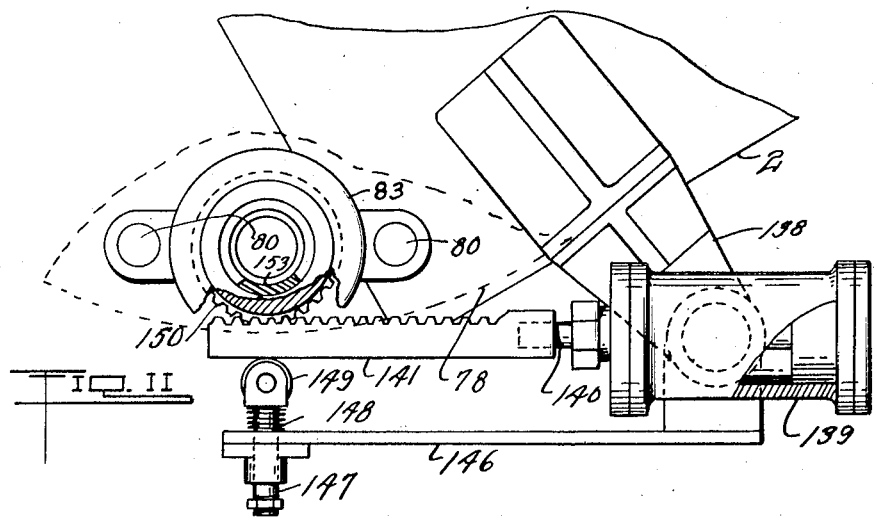
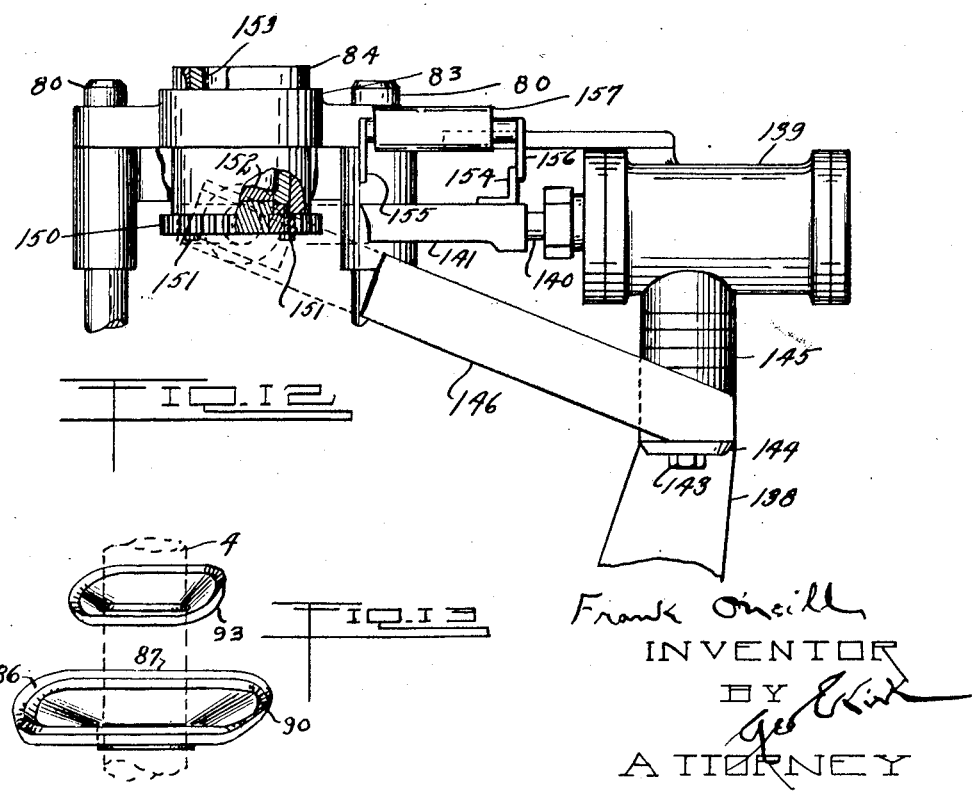
Frank O'Neill
INVENTOR
BY
ATTORNEY

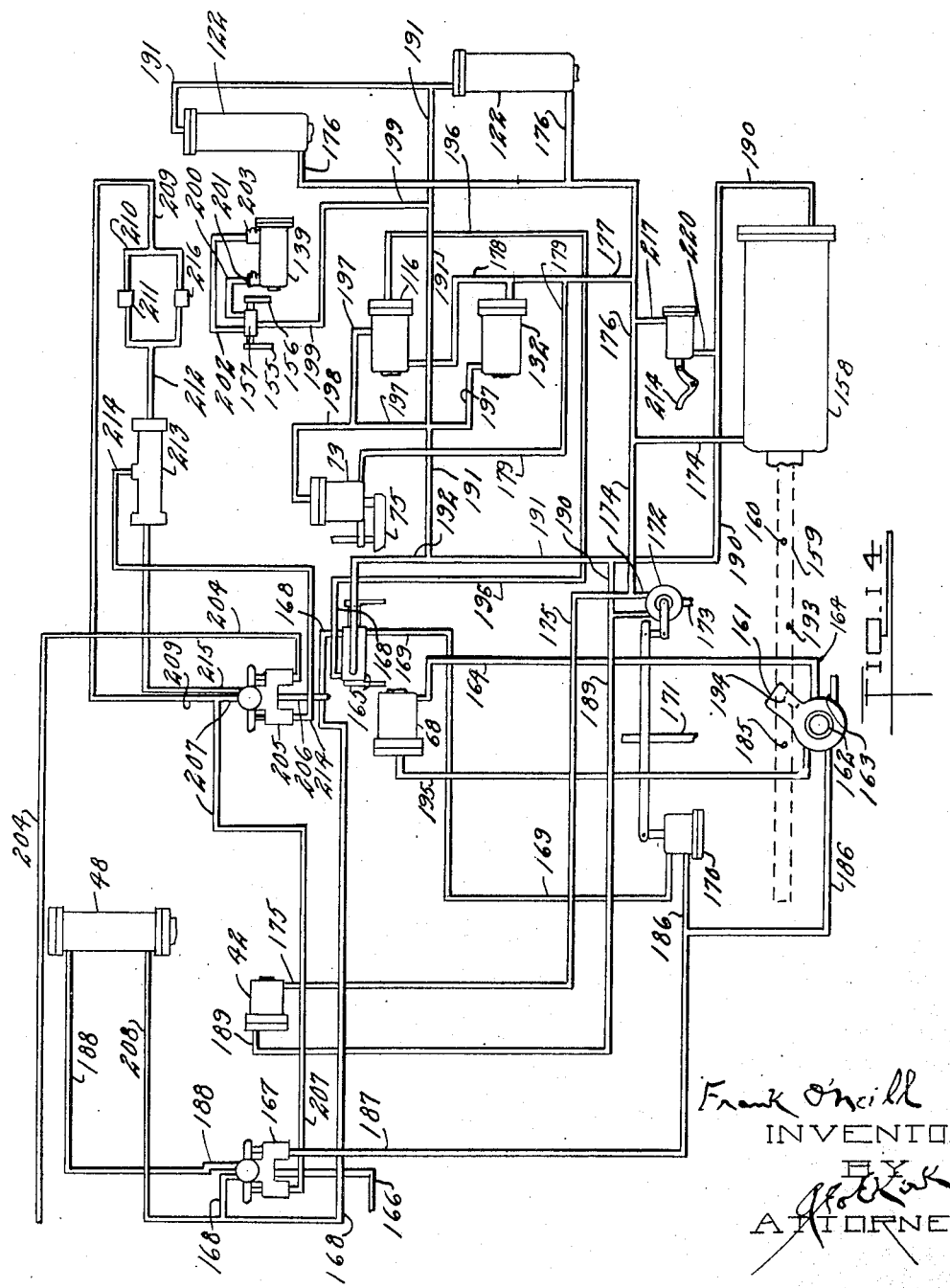

Patented Sept. 13, 1927.

1,642,660

UNITED STATES PATENT OFFICE.

FRANK O'NEILL, OF TOLEDO, OHIO.

GLASS PRESSING AND BLOWING MACHINE.

Application filed February 19, 1924. Serial No. 693,817.

This invention relates to molten glass handling.

This invention has utility in press and blow operations in the handling of molten glass, as in the manufacture of containers, especially wide mouth or open top ware, as tumblers, and even has application to paste mold produced articles involving relative shifting between the mold and the glass during ware forming.

Referring to the drawings:

Fig. 1 is a plan view of an embodiment of the invention in a tumbler machine;

Fig. 2 is a section on the line II—II, Fig. 1, being through the press arm and the transfer arm of the press table of the machine;

Fig. 3 is a detail view in side elevation of the lock for the press cylinder at the press station of the press table;

Fig. 4 is a detail view on a reduced scale of the controlling cams for the blank or press table molds;

Fig. 5 is a vertical section of the press table plunger;

Fig. 6 is a detail view in section on an enlarged scale of the press mold and plunger in coacting relation;

Fig. 7 is a side elevation of the transfer between the press table and the blow table of the machine;

Fig. 8 is a section on the line VIII—VIII, Fig. 1, being through the transfer arm and the second blow arm or station;

Fig. 9 is a detail view in side elevation of the lock for the ring section of the mold at the blow station;

Fig. 10 is a plan view of the intermediate gear between the two carriers of tables;

Fig. 11 is a fragmentary plan view of a paste mold oscillator for eliminating mold marks in blown ware, especially of the thinner wall types of ware;

Fig. 12 is a side elevation, with parts broken away, of the oscillator of Fig. 11;

Fig. 13 is a detail view of the controlling cams for the blow mold lifting and depressing operations; and Fig. 14 is a power diagram of the piping connections for the machine.

Carried by rollers or wheels 1 is base or platform 2 from which rises columns 3, 4, and an intermediate minor column 5. The column 3 (Fig. 5) has bearing 6 carrying press table 7 from which extends an annular series of brackets 8 providing guides 9 eccentric of and parallel to the axis of the major column 3. In each of these guides 9 is a crosshead 10 carrying an outwardly extending horizontal ring 11. Each of these crossheads 10 has a roller 12 connected thereto by a pin 13. The minor column 5, intermediate the major columns 3, 4, is herein shown as having an intermediate driving gear 14 in mesh with gear 15 fixed with the press table 7 on the column 3 for effecting rotation of this press mold carrier 7.

Mounted on the base 2 are brackets 16 sustaining a cam. This cam is an actuating means effective in reciprocating the slides or crossheads 10, and comprises a riser portion 17 leading to a horizontal portion 18. This horizontal portion 18 is of an extent from charging station 19 to press station 20. Just after leaving this press station 20, in the intermittent driving of this table 7, the roller 12 effects lowering of the crosshead 10 and its one piece ring 11. This is brought about by an opposing or additional cam face. Connection 21 rising from the cam 17, 18, carries cam 22 coacting with the upper side of the roller 12 of each cross head 10 as passing away from the press station 20. These cams insure the elevation and depression of the press molds in sequence. This depressing of the cross head 10 is completed at transfer station 23. In each of these rings 11 of the crosshead 10 may be dropped a one-piece press mold 24 which is shown without a bottom valve. It accordingly follows in the step by step rotation of the table 7 that the press mold 24 is lifted into position for receiving the charge of molten glass at the charging or supply station 19; that this mold 24 is held in such lifted position in its progress to and at the press or forming station 20; and furthermore in traveling from this forming station 20 to the transfer or delivery station 23, each one piece press or blank mold 24 is depressed. Due to this depression, the mold 24 is down clear of the press blank thus permitting more ready transfer of such blank from the press table.

Each bracket 8 beyond the upper limit of its crosshead 10 has pivot pin 25 hinging ring mold sections 26, 27 (Fig. 1), as normally held closed by leaf spring 28. These ring sections 26, 27, provide a rib or lip forming mold portion 29 (Fig. 6), and thereover a seat 30. The one piece molds 24 are each provided with a shoulder 31 which may rest upon the ring 11. Centrally of each of these circular or one piece molds 24 is press article receiving recess or chamber 32.

As the empty mold 24 passes to the charging station 19 it has its shoulder 33 brought into position to embrace the ring sections 26, 27, as in closed position, to be sealed therewith as a mold unit. Each bracket 8, upward from the pivot pin 25, has a pair of extensions 34, in each of which is mounted a radially extending guide rod 35. These guide rods 35 are parallel to each other as to the pair, one on each side of the region above a press mold. Extending from one of these rods 35 of a pair to the other rod of such pair, is a crosshead or slide 36 carrying a ring portion 37 about the lower region of which may extend the sectional ring 26, 27, in embracing relation.

A wedge head pin 38 is normally thrust upward by spring 39 (Fig. 2) away from position which would tend to open the ring 26, 27. The onepiece ring member 37 advantageously has a funnel portion 40 (Fig. 6) so that the charge of molten glass at the charging station 19 may be more conveniently directed into the mold below this portion 37.

Press station.

There rises from the base 2, at the press station 20, a bracket 41 (Figs. 1, 2, 3) carrying radially of the column 3 a cylinder 42, from which extends piston rod 43 toward the column 3. This piston rod 43 carries slotted portion 44, and inwardly therefrom a clamp or lock portion 45 effective to engage ears 46 of the neck ring or two-part mold section 26, 27.

The column 3, at the press station 20, carries radially extending arm 47 overhanging the press table 7. This arm 47 (Figs. 1, 2, 5) has cylinder 48 rising therefrom axially parallel with the column 3. In this cylinder 48 is piston 49 connected to tubular piston rod 50 upwardly extending to collar 51 having pins 52 extending therebeyond to engage crosshead 53 coacting with spring 54 riding against collar 55 fast with rod 56 concentric with the piston rod 50. There is accordingly a yieldable connection between this tubular piston rod 50 and the rod 56 therein. This rod 56 extends through the tubular piston 50, and upon the lower side of the cylinder 48 and beyond this tubular piston rod 50, this rod 56 has nut 57. Beyond this nut 57 is a plunger portion 58 which, in operation, may enter the mold 24 in opposing relation to the walls of the recess 32 of such mold 24, thereby to effect the pressing operation upon a charge of molten glass as supplied to such mold at the preceding or charging station 19. Carried by this rod 56 about the nut 57 is loose collar 59. This structure provides that the collar 59 is normally thrust by spring 60 coacting with nut collar 61 on the piston rod 50. This nut 61 is adjustable to varying the compression of the spring 60. In the operation of the plunger 58, the collar 59 is at once yieldably seated on the ring member 37. Thereafter the plunger 58 may be thrust to a fixed extent into the recess 32 of the mold 24 to form the blank of constant size as to the blank body volume. Excess of metal oozes into region 62, above the lip forming mold portion 29. This is permitted by the adjustment of the collar 59 allowing the ring 37 to be shifted upward in the crosshead 36 as a guide.

The free end of the arm 47 beyond this cylinder 48 is provided with a supporting rod 63 extending down to the base 2. It is about this supporting rod 63 that the slot 44 extends to permit reciprocation of the lock portion 45 from the lock cylinder 42, during the press operation at the press station 20, to hold effectively the split ring portions 26, 27, against opening. The guide portion 18 at the press station 20 carries bracket 63' for adjustable anvil 63'' to sustain the mold 24.

The gather of glass as received at the charging station 19 is formed into a press blank at the station 20. This press blank 64 (Fig. 6) is shown as having central orifice or tapered portion 65 therein, and a finish or rib portion 66 at the upper portion. This finish or neck portion may be the crackoff portion held by the ring sections 26, 27, for tumblers, lamp chimneys, and such type of ware.

Transfer.

In the next step of travel by the table 7 from the station 20 to the station 23, the mold 24 is pulled downward by the roller 12 riding on the cam 22 (Figs. 2, 4). These cams positively control the up and down shifting of the press molds in their travel not only to the charging station, but to the press station, to the transfer station, and therefrom back, to the charging station. This descent of the press mold 24 as approaching the transfer station 23 leaves the blank 64 suspended from the neck ring 26, 27, as the carrier 7 stops with such blank at the station 23. The mold 24 is below such blank and clear thereof.

At the transfer station 23, the column 3 is provided with a radially extending arm 67 (Figs. 1, 2) carrying a radially extending cylinder 68, outward from which extends piston rod 69 carrying a crosshead having a notch 70 therein. This notch 70 so travels as to the transfer station 23 that upstanding portion 71 from the crosshead 36 rides into such notch 70.

Opposing the arm 67, the column 4 has radiating theretoward an arm 72 (Figs. 1, 8) carrying at its free end a vertical cylinder 73 having a downwardly extending piston rod 74 to a shoe 75. This shoe 75 extends toward the column 3 and carries an upstanding pin 76 coacting with guide 77 effective for holding this shoe 75 in radial position over a portion of the travel course of the pin 38 as carried by the crosshead 36. When the table 7 comes to a stop at the transfer station 23, the cylinder 68 is effective to thrust outward the crosshead 36 along the guide rods 35, and thus carries the press blank 64 away from the bracket 8 on the table 7 and toward the column 4. When this crosshead 36 reaches the limit of its outward travel, the action of the cylinder 73 is timed then to depress the shoe 75 to push downward upon the pin 38, thereby effecting wedging apart of the crack off sections 26, 27 against the action of the spring 28. The suspended press blank 64 is thus released clear of the carrier 7. The extent and positioning of the shoe 75 is such that after the release of the press blank 64, the cylinder 68 may effect retraction of the ring section 26, 27, and during this retraction earlier portion stroke, these rings are held open to clear the blank 64. As the pin 38 rides away from the shoe 75, the spring 39 tends to shift the pin 38 away from wedging position, to thus permit the spring 28 to effect closing of the ring sections 26, 27.

*Blow table.*

The column 4 carries a bearing 77' upon which is mounted a blow table 78 (Figs. 1, 8). This blow table 78 is rotated by gear 79 in mesh with the gear 14. In pairs about the blow table 78 are guide rods 80 axially parallel with the column 4. An auxiliary table section 81 anchors the upper end of these guide rods 80. On each pair of these guide rods 80 is a crosshead 82. Carried between each pair of guide rods is a ring 83 for a one piece mold 84. Adjacent the table 78 is a collar 85 on the column 4, having a cam provided with a riser section 86 from just beyond the transfer station 23. This riser section 86 merges into a straight or horizontal section 87 extending past blowing stations 88, 89. From this last blowing station 89 this cam has a depression portion 90 extending to take-off station 91. Above this collar 85 and just below the auxiliary table portion 81 is a second collar 92 carried by the column 4. This second collar 92 has opposing the cam of the collar 85, a cam having portion 93 above the depression portion 90. Between these collars 85, 92, fixed to the column 4, is a loose collar 94. The depression portion 90 of the lower cam on the collar 85 is connected by cam section 95 with the riser portion 86, thereby completing the circuit for this lower cam. This collar 94 carries a fulcrum pin 96 for radially extending lever 97 as to each pair of guide rods 80. Pins 98 from the crosshead 82 engage in slots 99 at the outer forked end of each lever 97. From the lower side of each of these levers 97 extends ear 100 carrying a roller 101 to ride upon the cam 86, 87, 90, 95. Each of these levers 97 from the upper side thereof has an addition ear 102 carrying a roller 103. These rollers 103 as coacting with the cam portion 93 insure the depression of the one piece mold 84 as leaving the last blowing station, so that the blown article is suspended above the finish mold as the ware is brought to the take-off station 91.

The upper or auxiliary table 81 on the blow table carries between each pair of guide rods 80 and parallel to the column 4, an upstanding pin 104 as a pivot bearing for ring sections 105, 106, as hinged crackoff holders. From each section 105, 106, extends radially inward a link 107 surrounded by a spring 108. These links 107 thus provide a positive opening and yieldable closing means for the sections 105, 106, as these links extend to crossheads 109 radially slidable upon guides 110. Each of these crossheads or slides 109 carries an upstanding pin 111 upon which is mounted a roller 112. The column 4 above the auxiliary table section 81 carries a collar 113. This collar 113 carries a cam having short radius portion 114 extending from adjacent the take-off station 91 to past the transfer station 23. From this short radius portion 114 just past the transfer station 23 extends a larger radius portion 115 past the two blow stations 88, 89, and into proximity to the take-off station 91.

Mounted by this collar 113 on the side of the column 4 towards the station 88 is a cylinder 116 (Fig. 1) having a horizontally movable piston rod 117 extending to cam lever 118 having fulcrum 119 carried by the collar 113 (Figs. 1, 8). At the transfer station 23 (Figs. 1, 7) at once the crackoff mold holder sections 26, 27, have moved to the outer limit position toward the column 4, the cylinder 116 has its piston rod 117 thrust outward, thereby causing the lever 118 to engage the roller 112 at the transfer station 23, and shifting such roller 112 away from the column 4 to effect closing of the ring sections 105, 106, about the blank 64 before the sections 26, 27, thereover have released such blank 64 as effected by the depression of the shoe 75. Accordingly as the transfer effecting ring sections 26, 27, are opened, the blank 64 settles down to have its rib or lip, as formed by the mold portion 29, engage upon and be supported by the ring sections 105, 106. The transfer is thus effected automatically at the position of rest at the station 23. As soon as the blank 64 is released to the ring sections 105, 106, the sections 26, 27, start while still open toward the column 3, and remain open until clear of the blank 64, then closing as the pin 38 rides clear of the shoe 75.

In the step by step rotation of the blow table 78 the travel from this transfer station 23 is toward the blow station 88, which in many classes of ware may provide all the blowing necessary. In this travel the roller 101 as actuated by the cam 86 swings the lever 97 upward and thereby brings the mold 84 about the suspended press blank 64. During this travel, the crosshead 109 serves to hold the roller 112 in the position to guide it upon the larger radius cam portion 115 thereby insuring holding of the ring sections 105, 106, closed during the period of such shifting of the press blank to the first blow station 88 from the transfer station 23. As the travel of the blank of ware being formed continues past the blow stations 88, 89, the cam 115 is effective to maintain this closed condition for the ring sections 105, 106.

At the first blow station 88, the column 4 is provided with radially extending arm 120 (Fig. 1), while at the second blow station 89, the column 4 is provided with a second overhanging radially extending arm 121 (Figs. 1, 8). These stations 88, 89, are similar and permit of two stage blowing of the ware. These outwardly extending arms at the blow station carry therebelow a blow cylinder 122 for downwardly thrusting piston rod 123 carrying blow head 124. The mold 84 as mounted in the ring 83 of the cross head 82 has a shoulder 125 resting on such ring 83 so that this mold 84 is loosely held even to permit rotation or oscillation as to the ring 83. Ledge 125' on such ring sections 105, 106, allows such sections to rest lightly on the mold 84, but takes the blowing strain on the crosshead 81 so that the mold 84 is free to oscillate. Each of these sections 105, 106, has an extension 126 which may be engaged by lock head 127 carried by the piston rod 123. Thrust rod 128 is held in fixed angular relation as to the column 4 by rod 130 from bracket 129 carried by the piston rod 123. This rod 130 as shifted by the bracket 129 slidably coacts with bracket 131 fixed with the blow cylinder 122. As the blow table 78 comes to a stop to bring a blank to the blow station 88, there is a shifting of the blow head 124 into closing position upon the blow mold therebelow, and simultaneously therewith, there is locking of the ring sections 105, 106, by the yieldable thrusting of the lock portion 127. Following this first stage blowing there may be a shifting of the table 78 to bring the blank as having received one blowing action, to the second blow station 89, where there may be a repetition of the blowing operation.

Take-off.

As the blown ware is brought to a stop at the take-off station 91, cylinder 132, carried by the collar 113 on the column 4 (Figs. 1, 8) effects pulling of lever 134 for engaging the roller 112 of the blow mold assembly at such station. This roller 112 as pulled into short radius portion 114 of the cam 114, 115, thereby effects opening of the crackoff holder or ring sections 105, 106, at this station 91. This opening of these sections 105, 106, does not occur until after the onepiece mold 84 has been withdrawn downward by the cam 93 to be clear of and below the finished ware 135 as suspended by the ring 105, 106. Such ware 135 as hanging openly above the mold 84 is engaged by clamp take-off device 136 connected to be driven by its gear 137 in mesh with the gear of the table 78. The ware 135 as released by the ring sections 105, 106, is held suspended by the gripping device 136. The blow table 78 starts its next step to the transfer station 23, and simultaneously this article 135, at the take-off station 91, is carried by the gripping device 136 clear of the table 78 due to the interconnected drive from the table 78 to the gear 137. As the table 78 moves such blow mold assembly from the take-off station 91 to the transfer station 23, the ring sections 105, 106, are still open and remain open until they reach the station 23 where they are closed by the action of the cylinder 116 as the next blank is delivered thereto.

Oscillator.

In instances where it is desired to operate this structure with paste molds, mechanism for shifting such mold as to the glass being formed into ware is provided. To this end there rises from the base 2 a bracket 138 upon which is mounted cylinder 139 having piston rod 140 carrying rack 141. Bolt 143 as engaging washer 144 mounts the cylinder 139 for angular adjustment on the bracket 138, while insertion of washers 145 permits adjustment as to height for the cylinder 139, to thus care for molds of different lengths (Figs. 11, 12). The angular adjustment permits shifting of the cylinder 139 for taking a tangent to molds of different diameters. Also carried from the bracket 138 is auxiliary bracket 146 loosely mounting pin 147 normally urged by spring 148 to have roller 149 ride against the back of the rack 141 to thereby yieldably hold such rack 141 into meshing relation with pinion 150 mounted by bolts 151 to hold in position valve or bottom 152 for the mold 84 as equipped with paste lining 153. When the mold 84 comes to rest at the blow station, air supply to the cylinder 139 at once causes travel of the rack 141. This rack 141 is provided with projection 154 at the outer travel limit striking arm 155 and at its inner travel limit striking arm 156. These arms 155, 156, are carried by slide valve 157 and there is thus effected a supply of motive fluid first to one end and then to the other end of the cylinder 139 for bringing about rapid reciprocation of the rack 141 while the mold 84 is at a station of rest and undergoing blowing operation upon a partially formed glass charge therein. The mold 84 with its paste lining 153 is moved or oscillated back and forth several times during the blowing operation with the molten glass coming against the wall of said mold.

*Power control.*

The main cylinder 158 in the outward or idle stroke or travel of its rack 159 has, near the end of such stroke, pin 160 strike arm 161 of valve 162 (Fig. 14). This valve 162 as thus rocked connects power air from line 163 for flowing by line 164 to the transfer cylinder 68 to effect shifting of the crosshead 36 from its outward position toward the table 7. The crosshead carried by the piston rod 69 in this travel from position over the table 78, has a projection which shifts valve 165 to connect power air line 166 by way of rocker valve 167 with line 168 past this transfer valve 165 to line 169 extending to lock bar cylinder 170 to effect lowering of lock bar 171 to free the table 7, 15. This releasing operation for the press table also effects operation of lock bar valve 172 to connect power air line 173 to line 174 extending to the main drive cylinder 158 for effecting the inward or driving stroke operation of the rack 159.

From this line 174 is branch line 175 to press mold locking cylinder 42 inner end to effect withdrawing of the clamp portion 45 from the ears 46 of the ring sections 26, 27. This line 174 has additional branch line 176 to the lower ends of the blow cylinders 122 at the blow stations 88, 89. As these cylinders 122 have their piston rods 123 move upward, the blow heads 124 are lifted clear of the blow molds 84 and the rings 105, 106, thereover, and simultaneously the locks 127 clear the ears 126 of the sections 105, 106.

Branch line 176 has branch 177 to the cylinder 132 for resetting the mold ring opening lever 134 by thrusting it outward, while simultaneously by way of branch 178 from the branch 177 to the cylinder 116, resetting of the lever 118 occurs by drawing such inward. From the branch 177 extends branch 179 to the cylinder 73 at the transfer station, to effect lifting of the shoe 75.

As the rack bar 159 reached the end of its idle stroke, it has carried segment 180 through an idle oscillation to swing clutch pin 181 as riding along guide 182 to a point just beyond such guide, so that spring 183 may at once thrust such pin 181 (Figs. 8, 10) upward into clutching or coupling relation with the gear 14 by engaging in an opening 184. By varying the stroke of the rack 159 and the length of the guide 182, the arc travel of the tables may be varied to accommodate different numbers of arms or mold groupings. The showing is of six arms per table or carrier. The various functions of the machine as occurring at the positions of rest having all been disconnected or shifted to clear the machine for table shifting, the power air in the line 174 is effective for shifting the rack 159 on the inward stroke, thereby operating through the gear 14 to shift the press table or blank mold carrier 7, 15, as well as the blow or finish mold carrier 78, 81, each clockwise through an arc of 60°.

The rack 159 as reaching the end of its driving stroke has pin 185 thereon strike the arm 161 of the valve 162, and thus effect control of power air for flowing from the line 163 past this valve 162 by way of line 186 to the lock bar cylinder 170 for throwing the lock bar 171 into press table engaging position. From this line 186 extends branch 187 to the rocker valve 167 effecting shifting of this valve 167 to connect the power air line 166 through this valve 167 to line 188 extending to the upper end of press cylinder 48.

The action of the lock bar cylinder 170 operates the lock bar valve 172 to connect power air from the line 173 past this valve 172 and by way of line 189 to the outer end of lock cylinder 42 at the press station for effecting locking of the ring sections 26, 27, as the press plunger 58 descends into the press mold 24. This line 189 has branch 190 extending to the opposite end of the main drive cylinder 158 from the line 174, to effect the idle or outward travel recover stroke of the rack 159. This line 190 has branch 191 extending to the upper ends of the blow cylinders 122, and branch 192 extending to the transfer valve 165. The blow cylinder 122 are operated for mold locking and the blowing operation, and the rack bar 159 has started on its idle stroke. At the start of this stroke, minor pin 193 strikes minor arm or lug 194 on the arm 161 to effect partial shifting of the valve 162, thus connecting power air from the line 163 past this valve 162 to flow by line 195 to the inner end of the transfer cylinder 68. The piston rod 69 is thus thrust toward the blow table and has projection carried thereby engage an arm on the transfer valve 165 to shift such valve to connect power air from the line 192 to line 196. Accordingly as the stroke of this rod 69 is completed, air is supplied to the cylinder 116 by the line 196 to effect closing of crackoff holders or ring sections 105, 106, about the blank 64 as shoved over the blow table 78. As the piston in this cylinder 116 is started, leakage from this cylinder 116 is thus timed to be had by line 197 extending to the outer end of the cylinder 132 to effect an opening of the crackoff ring 105, 106, at the take-off station 91 at a time a little retarded after the closing action of the rings at the transfer station 23. The ring 105, 106, has accordingly released the finished article 135 at the station 91 as branch line 198 from the line 197 extending to the upper end of the cylinder 73 effects lowering of the shoe 75 to effect simultaneous opening of the ring sections 26, 27, at station 23 as the rings 105, 106, come about the ware as transferred.

The control or timing of these operations as thus far described may apply to general press and blow operations. For paste mold operation, the air line 191 has branch 199 to the valve 157, similar to the valve 165. At the outer limit of travel of the piston rod 140, the projection 154 by striking the arm 155 connects the air form the line 199 past this valve 157 to line 200 and by check valve 201 to the outer or piston rod end of the cylinder 139. As the piston rod 140 approaches the inner end of its stroke, the projection 154 strikes the arm 156 and again shifts the valve 157, this time to permit the air to flow by way of line 202 past check valve 203 to the inner or back end of the cylinder 139, while the check valve 201 releases the air for escape from the opposite end of this cylinder 139. During the stopping interval as controlled by the adjusted rate for air escape at these check valves 201, 203, the cylinder 139 acts as an automatic oscillator in reciprocating the rack 141 and thereby moving the one piece paste mold as to the ware as being blown thereinto.

To initiate the cycle of operations as above disclosed, the primary control may be at the charging station for manual trip in manual feeding or charging, or for automatic control in a desired timing or sequence when there is machine feeding. As the feeding of the charge into a press mold 24 is completed, power air by way of line 204 may flow to rocker valve 205, there to effect connection of power air from line 206 past this valve 205 to flow by line 207 to shift the rocker valve 167, and thereby cut off the supply of power air from the line 166 to the line 188 at the press cylinder 48, but in so doing connect this line 166 by way of this valve 167 and line 168 having branch 208 so that there is reverse action at the press cylinder 48 and its plunger 58 is lifted clear of the press mold. From the line 207 extends branch line 209 to line 210, past check valve 211 and by way of line 212 to timing tank 213 effecting a retarded timing for flow of air from this tank 213 by way of line 214 to the rocker valve 205 to effect resetting thereof. This resetting of this valve 205, also by way of line 215 resets the timing tank 213 with the adjusted air escape controlled by adjustable check valve 216.

However, the rocker valve 167 remains set for the flow of power air into the line 168. This means that as the idle stroke of the rack 159 is completed and the valve 162 is shifted for the retraction travel of the transfer rings 26, 26, by air flow to the cylinder 68, the rack 159 will be idle until there is power air in the line 168 connected by the transfer cylinder piston rod 69 retraction or recover travel effecting setting of the transfer valve 165, thus connecting power air by way of the line 169 to the lock bar cylinder 170 for releasing the press table, and a repetition of the cycle of operations. Inasmuch as the gear 14 is between the tables, this locking of the press table effectively holds both tables from shifting, and accordingly, the unlocking releases the tables for the simultaneous step by step operation.

From the line 176 extends branch 217 to clutch cylinder 218 for shifting angle lever 219 to depress the clutch pin 181 at the end of the driving stroke of the segment 180. Accordingly as the idle stroke of the rack 159 begins, the pin rides from this lever 219 to the guide 182. This lever 219 is reset by air from the line 190 by way of branch 220 to the cylinder 218.

As herein disclosed this press and blow machine has a field for producing a wide range of sizes and kinds of glass ware. The range of machine size as to the number of arms, even with the same spacing between the columns 3, 4, is obtained as heretofore pointed out by varying the angle of rotation of the segment 180. In the embodiment herein disclosed the driving turn for the gear 14 is five twelfths of a rotation.

The one piece press blank without valve makes possible the production of an article without a bottom mark.

What is claimed and it is desired to secure by Letters Patent is:

1. A glass forming machine embodying a rotary carrier, molds mounted thereby, two-part ring top sections for the molds, a forming station including a superposed reciprocable member for entering the molds, a supporting rod for the member, and as to which rod the carrier is rotatable, and a lock for the ring top section disposed about said rod.

2. A glass forming machine embodying a rotary carrier providing a delivery station, an annular series of molds mounted on the carrier, two-part ring sections for the molds, control means effective during carrier rotation for withdrawing the molds from the ring sections to expose the glass carried by the ring sections at the delivery station, a second carrier, ring sections and relatively shiftable molds on said second carrier, and means for causing said ring sections of the first carrier as exposing glass carried thereby to deliver such glass to a ring section on the second carrier.

3. A glass forming machine embodying a rotary carrier providing a delivery station, an annular series of molds mounted on the carrier, a twopart ring section for each mold, control means including a cam effective to expose the glass during carrier rotation for lowering the molds away from the ring sections to leave the glass carried at the delivery station by the ring sections, a second rotary carrier, molds on the second carrier, two part ring sections for each second carrier mold as to which said second carrier molds are respectively movable, power driving means for the carriers bringing said second carrier ring sections in sequence to approach exposed glass of a first carrier ring section at said delivery station, and means for causing delivery of the glass from its sustaining ring section to a second carrier ring section.

4. A glass forming machine embodying a column, a rotary carrier thereon, an annular series of onepiece molds mounted on the carrier, twopart ring sections for the molds, said carrier having a delivery station, control means including a cam effective during carrier rotation for lowering the molds away from the ring sections to expose the glass suspended by the ring sections at the delivery station, said cam being mounted fixed with the column, a second rotary carrier, blow molds and glass receiving rings independently of said molds on the second carrier, as movable in carrier rotation to approach said delivery station, and delivery effecting means for opening the ring sections of the first carrier at the delivery station for discharging glass therefrom into a second carrier ring.

5. A glass forming machine embodying a column, a rotary carrier thereon, an annular series of onepiece molds mounted on the carrier, two part ring sections for the molds, said carrier having a delivery station, control means including a cam effective during carrier rotation for lowering the molds away from the ring sections to expose the glass to be carried by the ring sections at the delivery station, said cam being mounted fixed with the column, and means at the delivery station carried by the column and movable radially from the column to shift the ring sections with the exposed glass from position over its lowered mold.

6. A glass forming machine embodying a column, a rotary carrier thereon, an annular series of onepiece molds mounted on the carrier, twopart ring sections for the molds, said carrier having a transfer station, control means including a cam effective during carrier rotation for lowering the molds away from the ring sections to expose the glass to be carried by the ring sections at the transfer station, means at the transfer station for shifting the ring sections as to the carrier with the exposed glass from position over its lowered mold, and additional means for opening the shifted ring sections.

7. A glass forming machine embodying a rotary carrier, an annular series of molds on the carrier, levers having fulcra near the axis of the carrier and extending outward therefrom, rings on the outer ends of the levers for mounting said molds, and means between the mold carrying rings and fulcra for swinging the respective levers for effecting raising and lowering of the respective molds in sequence.

8. A glass forming machine embodying a first rotary carrier, an annular series of onepiece press molds mounted on the first carrier, a twopart ring top section for each press mold, a second rotary carrier, an annular series of blow molds mounted on the second carrier, a twopart ring top section for each blow mold, said carriers having therebetween a transfer station, and cam means effecting lowering of the press and blow molds away from the twopart rings before such rings reach the transfer station.

9. A glass forming machine embodying a column, a rotary carrier thereon, an annular series of one-piece molds mounted on the carrier, two-part ring sections for the one-piece molds, said carrier being provided with a delivery station, control means effective during carrier rotation for effecting relative up and down movement between the molds and their respective two-part ring sections to leave the glass suspended from the ring sections at the delivery station, means for opening the ring sections for releasing suspended glass therefrom, a receiver for the suspended glass as released from an opening of a ring section, and mounting means for said receiver independently of the carrier, said ring section being movable radially relatively to the column for shifting the glass away from said one-piece mold over which it was suspended.

10. A glass forming machine embodying a rotary carrier, an annular series of one-piece molds on the carrier, a crosshead for mounting each mold, a pair of guide rods for each crosshead rising from the carrier, fulcra mounted in and fixed with the carrier at less distance from the carrier axis than said crossheads, lever means mounted in said fulcra, and lever operating cam means between the column and crossheads for raising and lowering the crossheads.

11. A glass forming machine embodying a carrier, a guide extending parallel to the carrier, an axially open glass delivery ring carried by the guide, an axially open glass receiving ring to which the delivery ring effects glass delivery upon shifting of the glass delivery ring along said guide, and a mold independent of said receiving ring.

12. A glass forming machine embodying a carrier, a guide extending parallel to the carrier, a glass delivery ring carried by the guide, a glass receiving ring to which the delivery ring may effect glass delivery upon shifting of the glass delivery ring along said guide, said rings each being two-part, and a blow mold independent of said glass receiving ring.

13. A glass forming machine embodying press and blow mechanisms including a press carrier, a guide extending parallel to the carrier, a two-part glass delivery ring carried by the guide, a two-part glass receiving ring carried by the blow mechanism, control means effecting transfer of glass from the delivery ring directly to the receiving ring, and a blow mold independent of said glass receiving ring.

14. A glass forming machine embodying a first rotary carrier, an annular series of one-piece molds mounted on the first carrier, a two-part ring top section for each of said molds, a second rotary carrier, an annular series of blow molds mounted on the second carrier, a two-part ring top section for each blow mold, and ring shifting mechanism including a ring section mounting and directing guide parallel to one of the carriers and providing a transfer station between said carriers for effecting delivery of glass from a press mold ring section to the blow mold ring section.

15. A glass forming machine embodying a first rotary carrier, an annular series of one-piece press molds mounted on the first carrier, a two-part ring top section for each press mold, a second carrier, an annular series of blow molds mounted on the second carrier, a two-part ring top section for each blow mold, and means for radially shifting and then opening the two-part ring of one carrier into delivery position as to the two-part ring of the other carrier, said top sections being above their companion mold sections at the delivery position.

16. A glass forming machine embodying a first rotary carrier, an annular series of one-piece press molds mounted on the first carrier, a two-part ring top section for each press mold and thereabove, a second rotary carrier, an annular series of blow molds mounted on the second carrier, a two-part ring top section for each blow mold and thereabove, and means for radially shifting and then opening the two-part ring of the first carrier into delivery position as to the two-part ring of the second carrier.

17. A glass forming machine embodying a first rotary carrier, an annular series of one-piece press molds mounted on the first carrier, a two-part ring top section for each press mold and thereabove, a second rotary carrier, an annular series of blow molds mounted on the second carrier, a two-part ring top section for each blow mold, and thereabove, said carriers having therebetween a transfer station, actuating means effecting delivery outward and from a press mold ring to a blow mold ring of an article of glass being formed, and press mold ring section opening means effective as a blow mold ring section is in proximity thereto.

18. A glass forming machine embodying a first rotary carrier, an annular series of one-piece press molds mounted on the first carrier, a two-part ring top section for each press mold and thereabove, a second rotary carrier, an annular series of blow molds mounted on the second carrier, a two-part ring top section for each blow mold and thereabove movable independently thereof, said carriers having therebetween a transfer station, radially extending guides for one carrier ring section, and actuating means for shifting guide carried ring sections into proximity with other ring sections and there opening the press mold ring sections in effecting delivery from a press mold ring section to a blow mold ring section.

19. A glass forming machine embodying a first rotary carrier, an annular series of one-piece press molds mounted on the first carrier, a two-part ring top section for each press mold, a second rotary carrier, an annular series of blow molds mounted on the second carrier, a two-part ring top section for each blow mold movable independently thereof, each of said ring sections being mounted with its corresponding mold, said carriers having therebetween a transfer station, and actuating means effecting delivery from a press mold ring to a blow mold ring, including means shifting a press mold ring toward the second carrier, and additional means for opening the shifted ring.

20. A glass forming machine embodying a first rotary carrier, an annular series of one-piece press molds mounted on the first carrier, a two-part ring top section for each press mold, a second rotary carrier, an annular series of blow molds mounted on the second carrier, a two-part ring top section for each blow mold movable independently thereof, each of said ring sections being mounted with its corresponding mold, said carriers having therebetween a transfer station, and actuating means effecting delivery from a press mold ring to a blow mold ring, including means radially moving a press mold ring toward the second carrier, additional means for opening the radially moved ring, and means for closing a blow ring about the glass as so radially shifted by the press mold ring.

21. A glass forming machine embodying a first rotary carrier, an annular series of one-piece press molds mounted on the first carrier, a two-part ring end section for each press mold, a second rotary carrier, an annular series of blow molds mounted on the second carrier, a two-part ring end section for each blow mold movable independently thereof, each of said ring sections being mounted with its corresponding mold, said carriers having therebetween a transfer station, and actuating means effecting delivery from a press mold ring to a blow mold ring, including means for shifting a press mold ring toward the second carrier, and means for opening the press mold ring as so shifted for releasing the glass from the press mold to be received by a blow mold ring.

22. A glass forming machine embodying two rotary carriers, an intermediate actuating gear therefor provided with a plurality of seats, and a reciprocating drive having stroke throw range coaction with said gear seats including for other than 180° rotation driving steps for said gear as a transmission connection through successions of at least three different seats in effecting intermittent driving of the carrier, whereby adaptation is had for different spacing angles between stations.

23. A glass forming machine embodying a rotary carrier, actuating means for the carrier, a mold mounted on the carrier, a central axis providing bearing for the mold parallel to the axis of the carrier, a sectional ring holder operable for engaging the glass against relative rotation shifting, and means disposed peripherally beyond the carrier and coacting for moving the mold on said central axis bearing for shifting the mold as about and relatively to the glass and as to the carrier and holder.

24. A glass forming machine embodying a rotary carrier, carrier actuating means providing a station of rest for the carrier, blowing means at said station, a first mold mounted on the carrier, a peripherally sectional mold operable for engaging and for holding the glass as to the carrier, and an oscillator disposed tangentially of the carrier at said station of rest for shifting the first mold as about and relatively to the sectional mold held glass and as to the carrier during operation of the blowing means.

25. A glass forming machine embodying a first mold section, actuating means for shifting said section into and out of gripping engagement with an article of molten glass, blowing means for engaging said section, a second mold section having a central axis bearing, an oscillator, a pneumatic actuator for the oscillator effective to operate the oscillator for shifting the second mold section on said bearing as to the first mold section while in axial alignment with said first mold section in effecting movement of the second mold section as enveloping and relatively to the glass therein, and control mechanism for determining the sequence of operations of said actuating means, blowing means and oscillator.

26. A glass forming machine embodying a first peripherally split mold section, actuating means for shifting said section into and out of gripping engagement with an article of molten glass, blowing means for engaging said first mold section, a second mold section, a pinion carried by the second mold section, a reciprocable rack engaging said pinion for effecting alternating rotary motion of the second mold section as to the first mold section in effecting movement of the second mold section as enveloping and relatively to the glass therein, and control mechanism for determining the sequence of operations of said actuating means, blowing means and oscillator.

27. A glass forming machine embodying a rotary carrier, actuating means for the carrier, a mold mounted on the carrier to be shifted therewith, a gripping ring for a molten article of glass, said mold having a bearing as coaxial with said ring, and parallel to the axis of the carrier, mold shifting means embodying a piston and cylinder device for rotating the mold as about and relatively to the glass and as to the ring and the carrier, and control mechanism for determining the sequence of operation of said actuating means and mold shifting means.

28. A glass forming machine embodying a first rotatable carrier having a charging station means providing a press station and a transfer station, a second relatively rotatable carrier, finish molds on the second carrier for receiving press ware from the first carrier at the transfer station, said second carrier having a blow station and a take-off station, said stations being spaced from each other, said first carrier including press molds, a lip forming mold for each press mold for sustaining ware from the press mold directing means for shifting the lip sustained ware radially of the first carrier and from the press mold, a support over each finish mold having press ware lip engaging means for receiving from the lip forming mold and holding suspended the ware above its finish mold as received from the first carrier, and means for shifting the finish molds as to said supports and ware suspended thereby.

29. A glass forming machine embodying a first rotary carrier having a charging station means providing a press station and a transfer station, a second rotary carrier eccentric of the first carrier for receiving press ware from the first carrier at the transfer station, said first carrier including a press mold, a press mold ring for each press mold, said second carrier including a blow mold, and a blow mold ring for each blow mold, means for bringing blow and press mold rings into proximity and there opening the press mold ring to release the press blank as the blow mold ring closes about the press blank in said press mold ring.

30. A glass forming machine embodying a rotary carrier, a first blank mold in one-piece as to its bottom and main body sides upward therefrom mounted on the carrier, a plunger operable into said mold for forming a blank, a ring upper section for said mold, a guide radially of said carrier for the ring section, a second mold having a bottom and a continuous one-piece annular side wall upward therefrom, a carrier for the second mold, means for clearing the blank as sustained by said ring upper section from said first mold and then shifting said ring section along said guide and opening the ring section to effect delivery of the suspended blank to the second mold.

31. A glass forming machine embodying a first blank mold of cup form having its side walls and bottom in one piece, a ring upper section for said first mold, a carrier for said first mold and ring section, a guide mounted on the carrier for the ring section, a plunger operable through said ring into said first mold for forming a blank, a second carrier axially eccentric of the first carrier, a second mold mounted in said second carrier, said second mold being of cup form and having its side walls in one piece, and means for clearing the first mold from its ring section and then shifting said ring section along said guide and opening the ring section for effecting delivery of a blank from the first mold to the second mold.

32. A glass forming machine embodying first and second relatively eccentric carriers, solid ring molds of one-piece form on each of said carriers, the molds of one of said carriers having integral bottoms, a neck ring mold section, a guide radially of one of the carriers for said ring section, and means for effecting transfer of a blank by shifting said ring mold section along said guide from a mold on one carrier to a mold on the other carrier.

33. A glass forming machine comprising a first rotary carrier, a second adjacent rotary carrier, one-piece ring molds mounted on the carriers for lowering, a neck ring for each mold, each of said rings being mounted with its corresponding mold and carrier, means mounting the first carrier neck rings against shifting towards said molds whereby glass is cleared of the molds on the first carrier by mold lowering, and means for shifting the first carrier ring with suspended glass into proximity to a second carrier ring to there release the glass to be received by the second carrier ring.

34. A glass forming machine comprising an annular series of one-piece blank molds, a relatively eccentric annular series of one-piece ring blow molds, one series of split ring neck mold sections for the blank molds, another series of split ring neck mold sections for the blow molds, each of said ring sections being mounted with its corresponding mold, a first rotary carrier for the blank mold series, a second rotary carrier for the blow mold series, means for shifting one ring section radially of its carrier into proximity to a different series ring section, and there releasing a blank from the blank ring section to the blow ring section.

35. A glass forming machine comprising relatively eccentric annular series of one-piece ring blank and blow molds, actuating means for rotating said series of molds in synchronism, neck mold sections providing a split ring for each mold, reciprocable mounting means for said rings independently of said molds, each of said rings being mounted with its corresponding mold, mounting means for the molds for lowering the molds away from the respective rings to permit ring support of glass over the respective lowered molds, means for opening the rings as suspending the glass to release the glass therefrom, and control mechanism for determining sequence of operation of the actuating means and shiftings of said mounting means for the rings and for the molds and effecting positioning of the rings for said opening and releasing of suspended glass therefrom.

36. A glass forming machine comprising a first carrier, a series of molds thereon, a second carrier, a series of molds on the second carrier, ring mold sections for one of said series of molds, means for positioning a ring mold in proximity to each mold, means for lowering a mold on each carrier as to their respective carriers to permit ring section holding of exposed glass from one of said lowered molds, ring mold section operating means for shifting and then delivering said exposed glass from one of such lowered molds to the other lowered mold, and control mechanism for determining the sequence of operation of said several means.

In witness whereof I affix my signature.

FRANK O'NEILL.